United States Patent
Wang

(10) Patent No.: US 11,849,199 B2
(45) Date of Patent: Dec. 19, 2023

(54) GLASS REAR COVER, ELECTRONIC DEVICE AND METHOD OF MANUFACTURING GLASS REAR COVER

(71) Applicant: GUANGDONG OPPO MOBILE TELECOMMUNICATIONS CORP., LTD., Guangdong (CN)

(72) Inventor: Xiaowei Wang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 60 days.

(21) Appl. No.: 17/541,395

(22) Filed: Dec. 3, 2021

(65) Prior Publication Data

US 2022/0094832 A1    Mar. 24, 2022

Related U.S. Application Data

(63) Continuation of application No. PCT/CN2020/094559, filed on Jun. 5, 2020.

(30) Foreign Application Priority Data

Jun. 5, 2019  (CN) .......................... 201910486926.9

(51) Int. Cl.
*H04N 23/52* (2023.01)
*H04M 1/02* (2006.01)
(Continued)

(52) U.S. Cl.
CPC .............. *H04N 23/52* (2023.01); *C03C 4/18* (2013.01); *C03C 21/002* (2013.01);
(Continued)

(58) Field of Classification Search
CPC ........ H04N 23/50; H04N 23/51; H04N 23/57; H04M 1/0264
(Continued)

(56) References Cited

U.S. PATENT DOCUMENTS

2012/0027399 A1   2/2012 Yeates
2012/0135195 A1   5/2012 Glaesemann et al.
(Continued)

FOREIGN PATENT DOCUMENTS

CN   207442970 U   6/2018
CN   207676574 U   7/2018
(Continued)

OTHER PUBLICATIONS

Chinese First Office Action with English Translation for CN Application 201910486926.9 dated Jun. 1, 2020. (18 pages).
(Continued)

*Primary Examiner* — Anthony J Daniels
(74) *Attorney, Agent, or Firm* — Young Basile Hanlon & MacFarlane, P.C.

(57) ABSTRACT

A glass rear cover includes a light-transmitting region. The light-transmitting region at least partially overlaps with a camera assembly in a thickness direction of the glass rear cover. The light-transmitting region allows light out of the glass rear cover to pass through the light-transmitting region to enter the camera assembly. The glass rear cover includes a first predetermined region and a second predetermined region. The first predetermined region is configured close to the light-transmitting region, and a strength of the first predetermined region is less than a strength of the second predetermined region. Therefore, when the glass rear cover is stressed, an extension direction of the crack on the glass rear cover is turned at the first predetermined region without reaching the light-transmitting region, avoiding the impact on image capturing of the camera assembly.

15 Claims, 8 Drawing Sheets

(51) Int. Cl.
    *H04N 23/57*     (2023.01)
    *C03C 4/18*     (2006.01)
    *C03C 21/00*     (2006.01)
    *H04N 23/45*     (2023.01)

(52) U.S. Cl.
    CPC .......... *H04M 1/0264* (2013.01); *H04N 23/45* (2023.01); *H04N 23/57* (2023.01); *C03C 2204/00* (2013.01)

(58) Field of Classification Search
    USPC ........................................................ 348/376
    See application file for complete search history.

(56) References Cited

U.S. PATENT DOCUMENTS

| | | |
|---|---|---|
| 2012/0236477 A1 | 9/2012 | Weber |
| 2013/0177302 A1 | 7/2013 | Weber |
| 2016/0357294 A1* | 12/2016 | Ozeki ................ B32B 17/06 |
| 2020/0014780 A1* | 1/2020 | Jones ................ H04N 23/54 |
| 2020/0017406 A1* | 1/2020 | Wilson ............... C03C 21/00 |
| 2023/0232558 A1* | 7/2023 | Bartlow ............. H05K 5/0086 |
| | | 361/807 |

FOREIGN PATENT DOCUMENTS

| | | | |
|---|---|---|---|
| CN | 208461858 U | 2/2019 | |
| CN | 109547676 A * | 3/2019 | ............ C03C 15/00 |
| CN | 109698874 A | 4/2019 | |
| CN | 208724032 U | 4/2019 | |
| CN | 110225157 A | 9/2019 | |
| EP | 3073567 A1 | 9/2016 | |

OTHER PUBLICATIONS

Chinese Notification to Grant Patent Right for Invention with English Translation for CN Application 201910486926.9 dated Aug. 28, 2020. (6 pages).

International Search Report with English Translation for International Application PCT/CN2020/094559 dated Sep. 4, 2020. (14 pages).

Extended European Search Report for EP Application 20819011.6 dated Jun. 10, 2022. (8 pages).

* cited by examiner

GLASS REAR COVER, ELECTRONIC DEVICE AND METHOD OF MANUFACTURING GLASS REAR COVER

CROSS-REFERENCE TO RELATED APPLICATION(S)

The present disclosure is a continuation-application of International (PCT) Patent Application No. PCT/CN2020/094559, filed on Jun. 5, 2020, which claims foreign priority of Chinese Patent Application No. 201910486926.9, filed on Jun. 5, 2019, the entire contents of both of which are hereby incorporated by reference.

TECHNICAL FIELD

The present disclosure relates to the field of electronic devices, and in particular to a glass rear cover, an electronic device, and a method of manufacturing a glass rear cover.

BACKGROUND

An electronic device, such as a mobile phone, a tablet computer and the like, may be configured with a rear camera. A rear cover of the electronic device may be a glass rear cover. If the electronic device falls on the ground or collides with other rigid objects, the rear cover may be broken, and glass at the camera may have a crack, which may affect an effect of capturing images.

SUMMARY

The present disclosure provides a fingerprint display panel and an electronic apparatus.

According to a first aspect, a glass rear cover includes a light-transmitting region. The light-transmitting region is configured to at least partially overlap with a camera assembly in a thickness direction of the glass rear cover. The light-transmitting region is configured to allow light out of the glass rear cover to pass through the light-transmitting region to enter the camera assembly. The glass rear cover comprises at least one first predetermined region and a second predetermined region, the first predetermined region is configured close to the light-transmitting region, and a strength of the first predetermined region is less than a strength of the second predetermined region.

According to a second aspect, an electronic apparatus is provided and includes the above glass rear cover.

According to a third aspect, a method for manufacturing the glass rear cover is provided and includes following operations.

A light-transmitting region is configured on the glass rear cover, wherein the light-transmitting region is configured to at least partially overlap with a camera assembly in a thickness direction of the glass rear cover, the light-transmitting region is configured to allow light out of the glass rear cover to pass through the light-transmitting region to enter the camera assembly.

A portion of the glass rear cover is treated, such that a first predetermined region and a second predetermined region are formed on the glass rear cover, wherein the first predetermined region is configured close to the light-transmitting region, and a strength of the first predetermined region is less than a strength of the second predetermined region.

BRIEF DESCRIPTION OF DRAWINGS

In order to more clearly illustrate the technical solutions in the embodiments of the present disclosure, the drawings used in the description of the embodiments will be described in brief in the following. Obviously, the drawings in the following are only some of the embodiments of the present disclosure, and other drawings may be obtained based on these drawings without any creative work for an ordinary skilled person in the art.

DETAILED DESCRIPTION

The technical solutions in the embodiments of the present disclosure will be clearly and completely described by referring to the accompanying drawings in the embodiments of the present disclosure. It shall be understood that the embodiments described herein are for the purpose of explaining the present disclosure only, but do not limit the present disclosure. Further to be noted that, for the purpose of description, the accompanying drawings show only some structures related to the present disclosure, instead of all the structures. Based on the embodiments in the present disclosure, all other embodiments obtained by any ordinary skilled person in the art without creative work shall fall within the scope of the present disclosure.

The "embodiments" in the present disclosure mean that a particular feature, a particular structure, or characteristic described in an embodiment may be included in at least one embodiment of the present disclosure. The presence of the term at various sections in the specification does not necessarily indicate a same embodiment, nor an independent or alternative embodiment that is mutually exclusive with other embodiments. The ordinary skilled person in the art shall explicitly and implicitly understand that the embodiments described herein may be combined with other embodiments.

Figure 1:
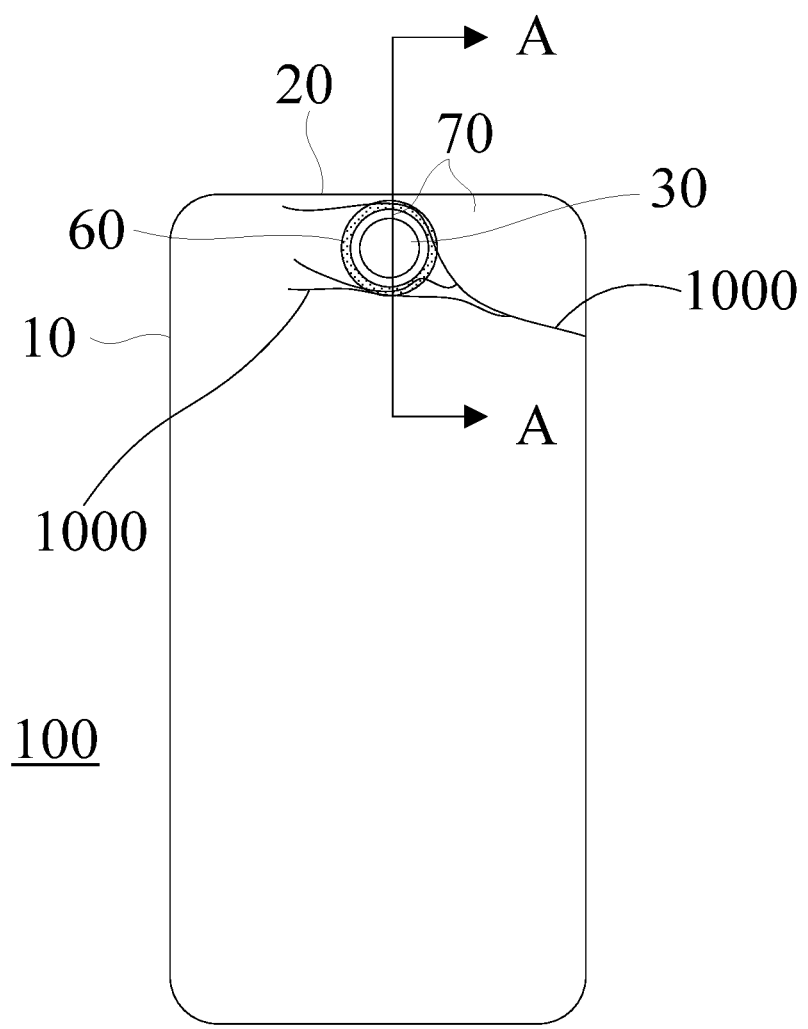
FIG. 1 is a structural schematic view of a glass rear cover according to an embodiment of the present disclosure.
Figure 2:
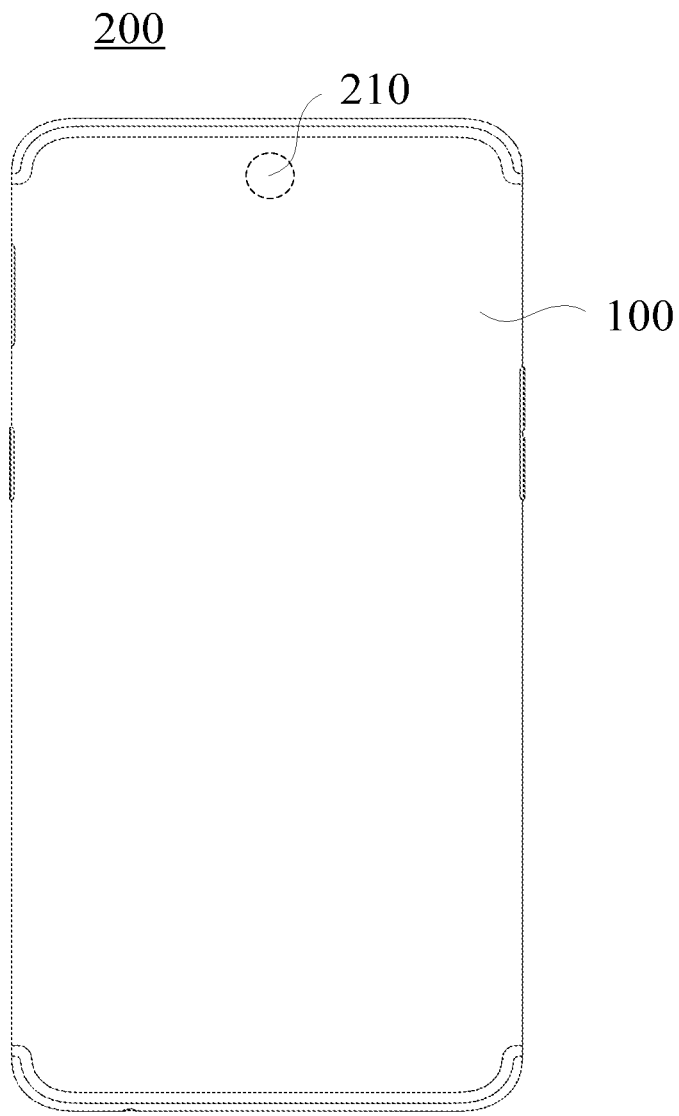
FIG. 2 is a structural schematic view of an electronic device having a glass rear cover according to an embodiment of the present disclosure.

As shown in FIG. 1 and FIG. 2, FIG. 1 is a structural schematic view of a glass rear cover according to an embodiment of the present disclosure, and FIG. 2 is a structural schematic view of an electronic device 200 having a glass rear cover 100 according to an embodiment of the present disclosure.

In detail, the electronic device 200 may be any of various types of computer system devices that are mobile or portable and perform wireless communications (only one form is illustrated exemplarily in FIG. 2). In detail, the electronic device 200 may be a mobile phone or a smart phone (such as, a phone based on iPhone™ or Android™), a portable gaming device (such as Nintendo DS™, PlayStation Portable™, Gameboy Advance™, iPhone™), a laptop computer, a PDA, a portable Internet device, a music player, a data storage device, and other hand-held devices, such as a headset. The electronic device 200 may also be other wearable devices that need to be charged (such as head-mounted devices (HMD) including an electronic bracelet, an electronic necklace, an electronic device, or a smart watch).

The electronic apparatus 200 may also be any one of a plurality of electronic devices, including but not limited to a cellular phone, a smart phone, other wireless communication devices, a personal digital assistant, an audio players, other media players, a music recorder, a video recorder, other media recorders, a radio, a medical device, a vehicle transportation equipment, a calculator, a programmable remote control, a pager, a laptop computer, a desktop computer, a printer, a netbook computer, a personal digital assistant (PDA), a portable multimedia player (PMP), a moving picture experts group (MPEG-1 or MPEG-2), an audio layer 3 (MP3) player, a portable medical equipment, a digital camera and their combinations.

In some embodiments, the electronic device 200 may perform a plurality of functions (such as, playing music, displaying videos, storing pictures, and receiving and sending phone calls). If necessary, the electronic device 100 may be a cellular phone, a media player, other handheld devices, a wristwatch device, a pendant device, an earpiece device, or other compact and portable devices.

As shown in FIG. 1 and FIG. 2, the glass rear cover 100 in the present disclosure is configured in an electronic device 200, serving as a rear shell of the electronic device 200. In detail, the glass rear cover 100 may be a cuboid or cuboid-like shaped. For example, when an outer surface of the glass rear cover 100 is flat, the glass rear cover 100 may be the cuboid.

Further, the glass rear cover 100 includes two first sides 10 and two second sides 20. The two first sides 10 are opposite to and parallel with each other. The two second sides 20 are opposite to and parallel with each other. Each of the two first sides 10 is connected to each of the two second sides 20 end-to-end. In detail, a connected corner between one of the two first sides 10 and one of the two second sides 20 may be right angle or rounded right angle. When an edge of the glass rear cover 100 close to the first sides 10 or the second sides 20 or the entire outer surface is curved, the entire glass rear cover 100 may not be a regular cuboid, but may be cuboid-like shaped.

To be noted that the terms "first" and "second" and the like herein are for descriptive purposes only and shall not be interpreted as indicating or implying relative importance or implicitly indicating the number of the indicated technical features. Therefore, a feature defined as the "first", the "second", and the like may or may not include one or more of the described features explicitly or implicitly.

In detail, the glass rear cover 100 has a light-transmitting region 30. The glass rear cover 100 serves as the back shell of the electronic device 200. A camera assembly 210 is configured inside the electronic device 200. When observe the electronic device 200 from a back of the electronic device 200, the camera assembly 210 is disposed under the light-transmitting region 30. The light-transmitting region 30 is a region of the glass rear cover 100 that locates above the camera assembly 210. For example, a projection of the camera assembly 210 on the glass rear cover 100 may at least partially overlap with the light-transmitting region 30 of the glass rear cover 100. The light-transmitting region 30 may allow light to pass through and may be a part of a second surface 50 of the glass rear cover 100, wherein the part of the second surface 50 does not have screen printing ink. The light-transmitting region 30 at least partially overlaps with the camera assembly 210 in a thickness direction of the glass rear cover 100. The light outside the glass rear cover 100 can pass through the light-transmitting region 30 to reach the camera assembly 210, such that the camera assembly 210 may perform image capturing. In the present disclosure, the glass rear cover 100 may be one integral piece of glass. A position of the glass rear cover corresponding to the camera assembly does not define a groove that extends through the thickness of the glass, but configures a light-transmitting region. The glass rear cover 100 does not define any groove, which extends through the thickness of the glass, on the entire surface. In this way, the back of the electronic device 200 may be flat, and the electronic device 200 may be more characteristic, have advantages in appearance, and provide better feeling when being held in hand.

Figure 3:
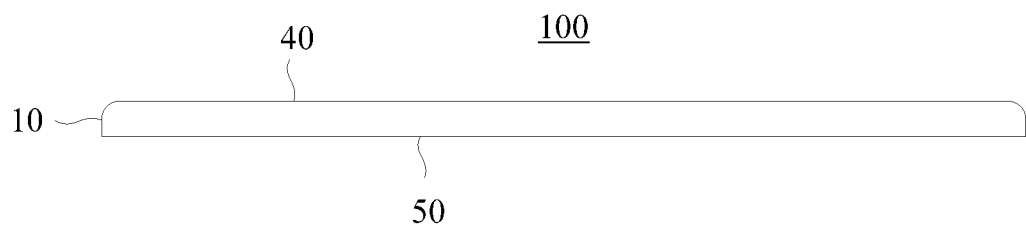
FIG. 3 is a cross-sectional view of a glass rear cover in a thickness direction according to an embodiment of the present disclosure.

Further, the glass rear cover 100 includes a first surface 40 and the second surface 50 opposite to the first surface 40, as shown in FIG. 3. FIG. 3 is a cross-sectional view of a glass rear cover in a thickness direction according to an embodiment of the present disclosure. A top surface of the camera assembly 210 (i.e., a light incident surface of the camera assembly 210) abuts against the second surface 50 of the glass rear cover 100. Alternatively, a gap may be defined between the top surface of the camera assembly 210 and the second surface 50 of the glass rear cover 100.

The glass rear cover 100 includes a first predetermined region 60 and a second predetermined region 70. The first predetermined region 60 is disposed close to the light-transmitting region 30. The first predetermined region 60 may be physically near the light-transmitting region 30, for example, in some embodiments, the first predetermined region 60 may at least partially surrounds the light-transmitting region 30. A strength of the first predetermined region 60 is less than a strength of the second predetermined region 70. In this way, when the glass rear cover 100 is hit by an object and cannot withstand an external force, a crack may be formed. When the crack extends to approach the camera assembly 210, the crack extends to the first predetermined region 60, and an extension direction of the crack may be turned away from the light-transmitting region 30 due to the first predetermined region 60. That is, the crack extends away from the camera assembly 210. In this way, a situation that the light-transmitting region 30 above the camera assembly 210 is cracked to affect the photographing effect, may be avoided. The reference numeral 1000 in the figure indicates the crack.

In an embodiment, a part of the second predetermined region 70 surrounds the light-transmitting region 30, and the part of the second predetermined region 70 is disposed between the first predetermined region 60 and the light-transmitting region 30. In this way, when the crack is formed on the glass rear cover, the crack extends to enter the first predetermined region 60 and extends along a shape of the first predetermined region 60. The extension direction of the crack may be turned away from the light-transmitting region 30, i.e. away from the region that covers the camera assembly 210. In this way, the part of the second predetermined region 70 that surrounds the light-transmitting area 30 and is closest to the camera assembly 210 may not be cracked, thereby preventing the light-transmitting region 30 above the camera assembly 210 from being cracked.

Figure 4:
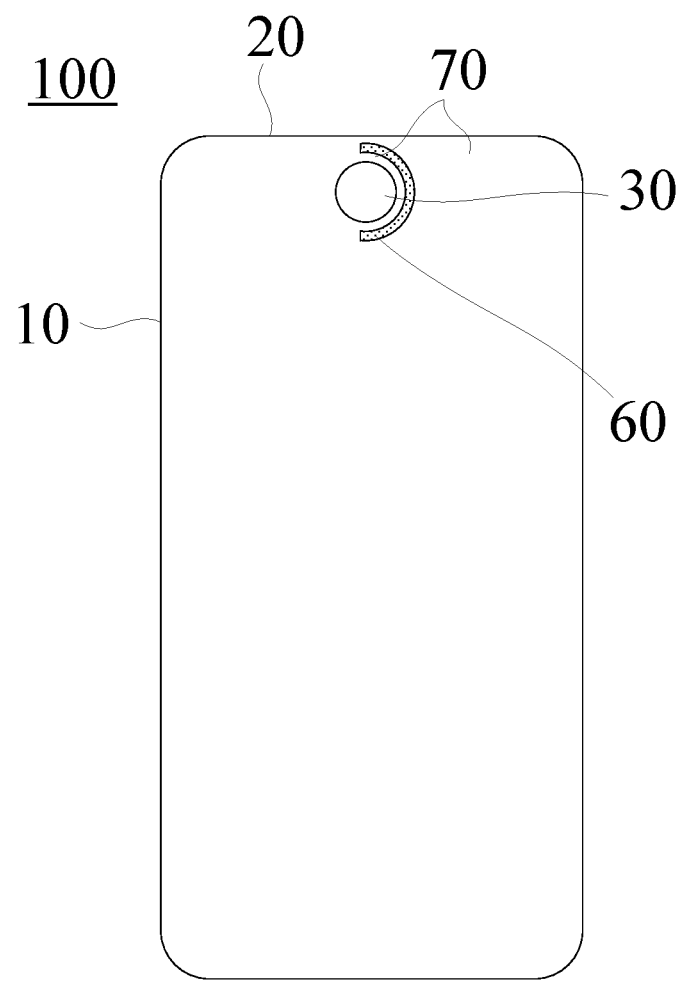
FIG. 4 is a structural schematic view of a glass rear cover according to another embodiment of the present disclosure.

Further, in an embodiment, the first predetermined region 60 is ring-shaped or arc-shaped. The first predetermined region 60 at least partially surrounds a periphery of the light-transmitting region 30. As shown in FIG. 1 and FIG. 4, FIG. 4 is a structural schematic view of a glass rear cover according to another embodiment of the present disclosure. In an embodiment, when the first predetermined region 60 is arc-shaped, the first predetermined region 60 may include one arc or a plurality of arcs that are spaced apart from each other.

Figure 5:
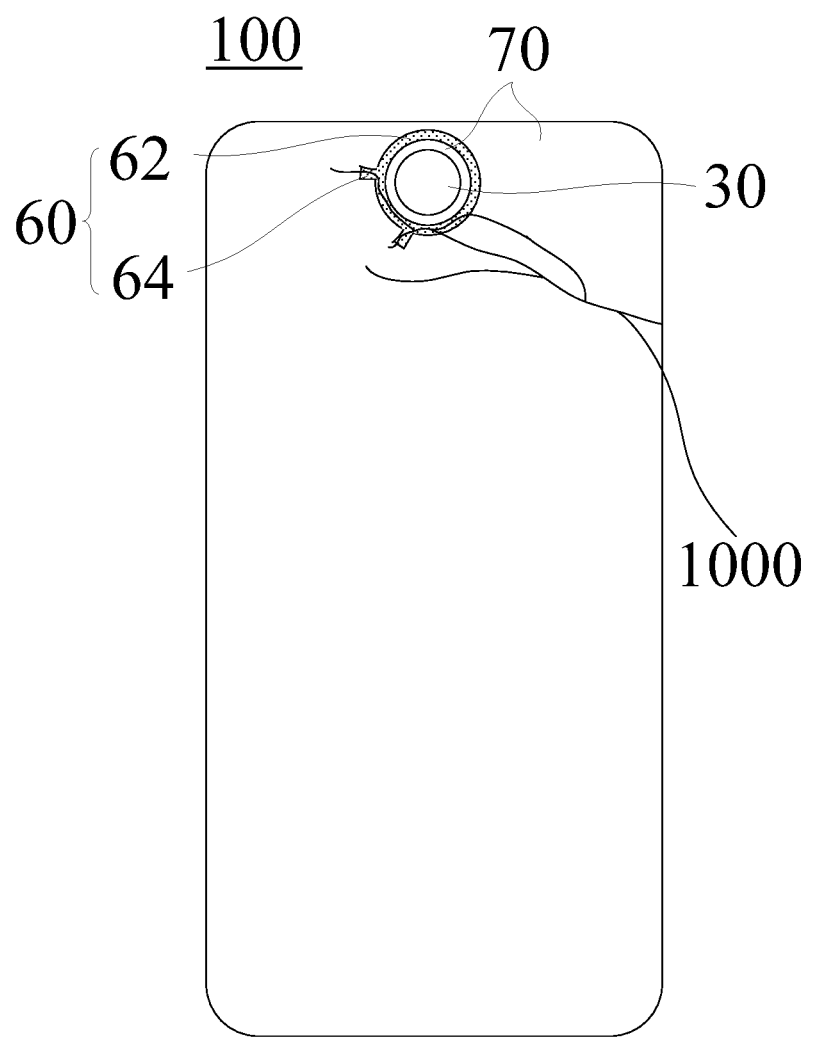
FIG. 5 is a structural schematic view of a glass rear cover according to still another embodiment of the present disclosure.

In another embodiment, the first predetermined region 60 includes a ring-shaped portion 62 and a branched portion 64, and the branched portion 64 extends from the ring-shaped portion 62 away from the light-transmitting region 30, as shown in FIG. 5, FIG. 5 is a structural schematic view of a glass rear cover according to still another embodiment of the present disclosure. It shall be understood that when the crack is formed in the glass rear cover 100, the crack may extend in a direction in which the crack receives a least resistance against extension. Therefore, when the first predetermined region 60 includes the branched portion 64, the crack may extend along a direction of the branched portion 64, extending away from the light-transmitting region 30.

Figure 6:
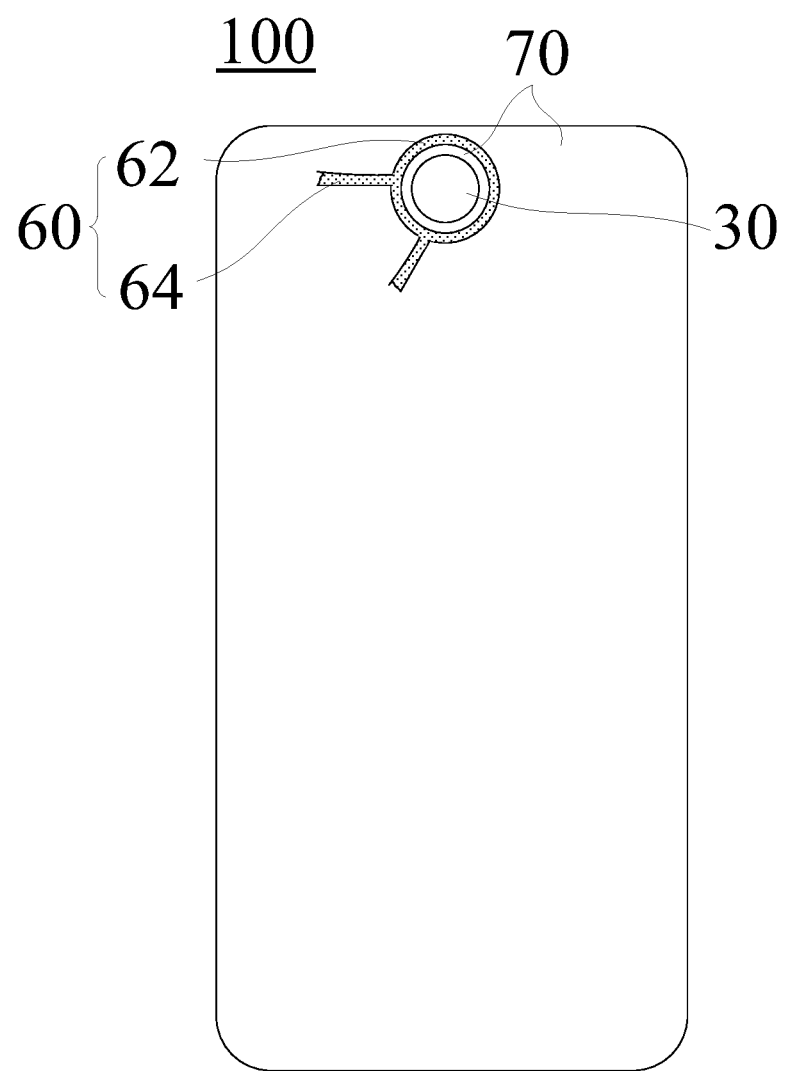
FIG. 6 is a structural schematic view of a glass rear cover of still another embodiment of the present disclosure.

In another embodiment, one or more branched portions 64 may be configured. Further, the branched portion 64 may be configured to be relatively short, as shown in FIG. 5. Alternatively, the branched portion 64 may be configured to be relatively long, as shown in FIG. 6. The present disclosure does not limit the length of the branched portion 64. FIG. 6 is a structural schematic view of a glass rear cover of still another embodiment of the present disclosure.

Figure 7:
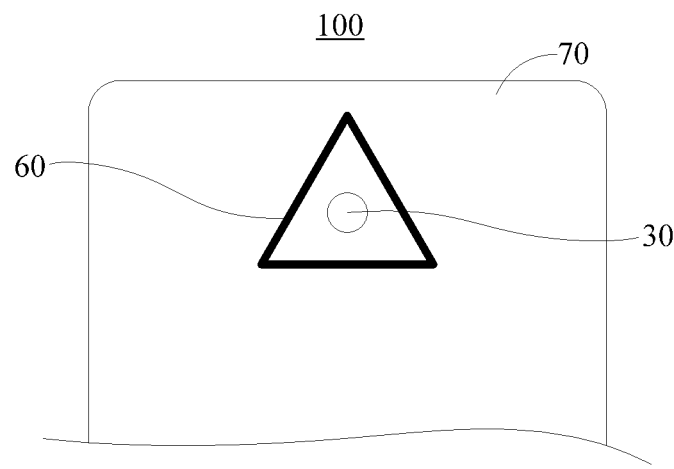
FIG. 7 is a structural schematic view of a part of a glass rear cover according to still another embodiment of the present disclosure.
Figure 8:
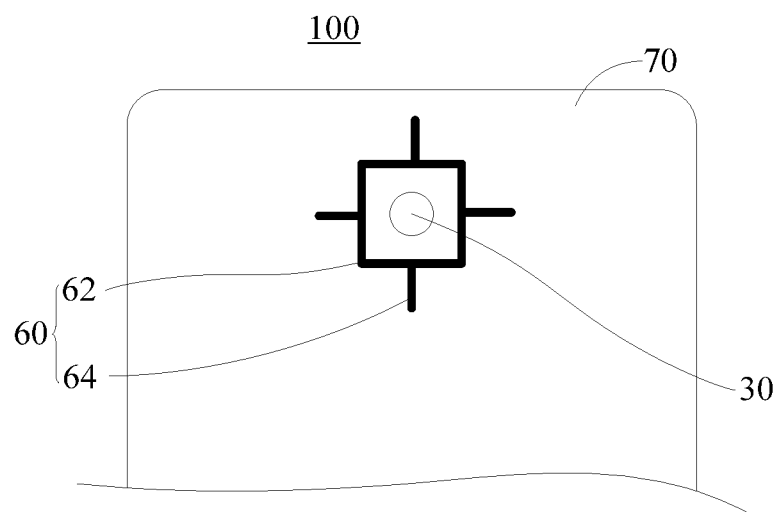
FIG. 8 is a structural schematic view of a part of the glass rear cover according to still another embodiment of the present disclosure.

In an embodiment, the camera assembly 210 has only one module, and one first predetermined region 60 is configured. The one first predetermined region at least partially surrounds the periphery of the light-transmitting region that covers the camera assembly 210, as shown in FIGS. 4-6. In addition, in some embodiments, the first predetermined region 60 may be rectangular, rounded rectangular, triangular, or the like. As shown in FIG. 7 and FIG. 8, FIG. 7 is a structural schematic view of a part of a glass rear cover according to still another embodiment of the present disclosure, and FIG. 8 is a structural schematic view of a part of the glass rear cover according to still another embodiment of the present disclosure. In the embodiment shown in FIG. 7, the first predetermined region 60 is triangular. In the embodiment shown in FIG. 8, the first predetermined region 60 is a rectangular structure (ring-shaped and rectangular portion 62) having the branched portion 64. The first predetermined region 60 may also be configured in other shapes as being understood by an ordinary skilled person in the art. The present disclosure will not list the shapes one by one.

Figure 9:
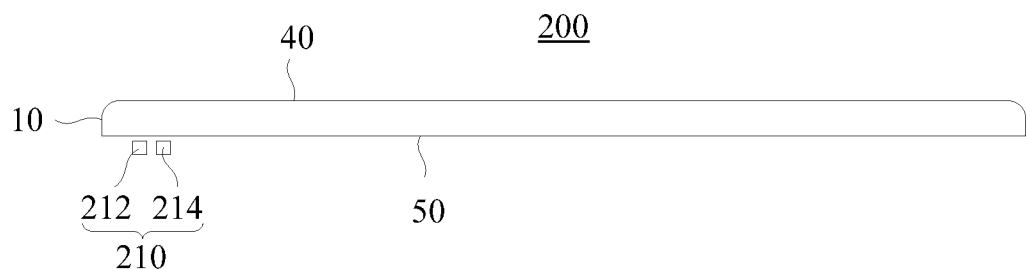
FIG. 9 is a cross-sectional view of a part of an electronic apparatus taken along a thickness direction according to an embodiment of the present disclosure.
Figure 10:
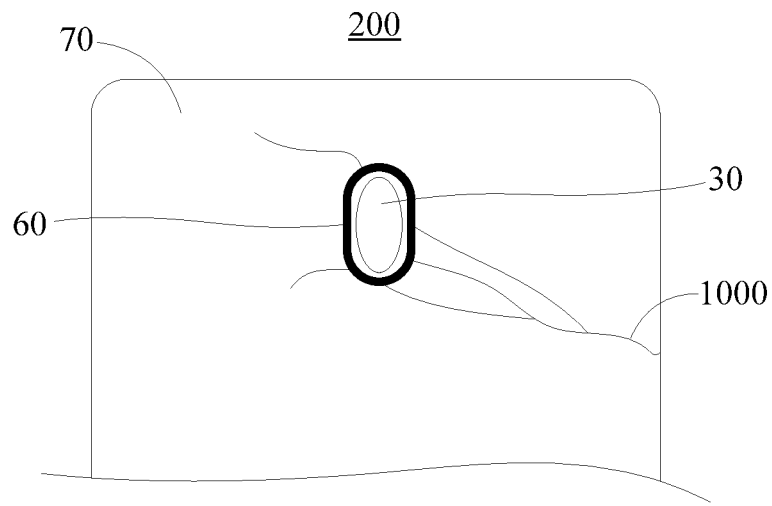
FIG. 10 is a schematic view of a part of a glass rear cover according to an embodiment of the present disclosure.

In another embodiment, the camera assembly 210 includes a first camera module 212 and a second camera module 214, as shown in FIG. 9 and FIG. 10. FIG. 9 is a cross-sectional view of a part of an electronic apparatus taken along a thickness direction according to an embodiment of the present disclosure. FIG. 10 is a schematic view of a part of a glass rear cover according to an embodiment of the present disclosure. In the present embodiment, one first predetermined region 60 may be configured, and at least partially surrounds the periphery of the light-transmitting region 30. In addition, the light-transmitting region 30 at least partially overlaps with the first camera module 212 and the second camera module 214 at the same time in the thickness direction of the glass rear cover 100.

Figure 11:
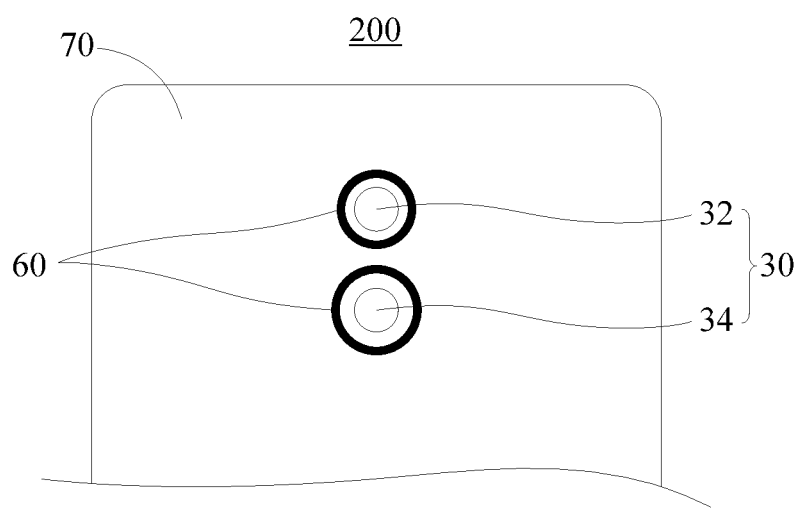
FIG. 11 is a schematic view of a part of a glass rear cover according to another embodiment of the present disclosure.

In another embodiment, two first predetermined regions 60 may be configured. The light-transmitting region 30 includes a first sub-region 32 and a second sub-region 34, as shown in FIG. 11. FIG. 11 is a schematic view of a part of a glass rear cover according to another embodiment of the present disclosure. The first camera module 212 corresponds to the first sub-region 32, and the second camera module 214 corresponds to the second sub-region 34. That is, the first camera module 212 is covered by the first sub-region 32 and receives light that passes through the first sub-region 32, and the second camera module 214 is covered by the second sub-region 34 and receives light that passes through the second sub-region 34. The first sub-region 32 at least partially overlaps with the first camera module 212 in the thickness direction of the glass rear cover 100. The second sub-region 34 at least partially overlaps with the second camera module 214 in the thickness direction of the glass rear cover 100. The two first predetermined regions 60 are respectively arranged close to the first sub-region 32 and the second sub-region 34. For example, one of the two first predetermined regions 60 is arranged to surround the first sub-region 32, and the other of the two first predetermined regions 60 is arranged to surround the second sub-region 34.

A reason of the strength of the first predetermined region 60 being less than that of the second predetermined region 70 will be illustrated in detail in the following, and detailed structures of achieving the different strengths will be illustrated in the following.

Figure 12:
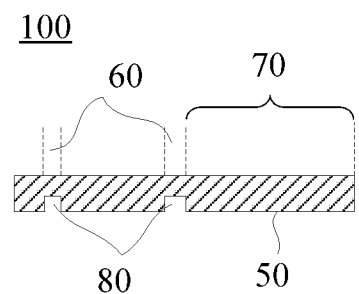
FIG. 12 is a cross-sectional view of the glass rear cover shown in FIG. 1, taken along the line A-A.

In one embodiment, a position of the glass rear cover 100 near the light-transmitting area 30 defines a groove 80 to reduce a thickness of the position of the glass rear cover 100, such that the strength of the position of the glass rear cover 100 is reduced. In this way, the first predetermined region 60 is formed at the position where the groove 80 is defined, as shown in FIG. 12. FIG. 12 is a cross-sectional view of the glass rear cover shown in FIG. 1, taken along the line A-A. Further, in the present embodiment, the groove 80 is defined in the second surface 50 of the glass rear cover 100, i.e., a surface of the glass rear cover 100 facing to an inside of the electronic device. The groove 80 is defined inside the electronic device 200. Therefore, the groove 80 cannot be observed from an outer side of the electronic device 200, such that the electronic device 200 has a better outer appearance. In other embodiments, the groove 80 may also be defined in the first surface 40 of the glass rear cover 100. The present disclosure dose not limit the surface that defines the groove 80.

It shall be understood that, in order to allow the glass rear cover 100 to have a better anti-drop property, the glass rear cover 100 may be chemically strengthened by applying chemical solution to increase the strength of the glass rear cover 100, reducing a risk of being cracked. According to a principle of chemical strengthening, the glass may be placed in a high-temperature chemical solution (such as approximately 400° C.) for a certain period of time (such as 0.5 h to 10 h). As a concentration of ions in the solution and a concentration of ions in the glass rear cover 100 may be different, an ion diffusion effect occurs. Large-sized ions in the solution exchange with small-sized ions that locate at a certain depth of the glass rear cover. For example, the solution contains potassium ions (k+). The potassium ions (k+) in the solution may exchange with sodium ions (Na+) in the glass rear cover 100. After the large-sized ions substitute the small-sized ions, a compressive stress is formed in the glass rear cover. When the glass rear cover 100 receives the external force, the strengthened compressive stress counteracts the external force, thereby reducing a probability of the glass rear cover 100 being broken.

In the present embodiment, when the glass rear cover 100 is strengthened, only the second predetermined region 70 is strengthened, and the first predetermined region 60 is not strengthened. Alternatively, the first predetermined region 60 is strengthened, and the second predetermined region 70 is strengthened to a higher extent. In this way, the concentration of potassium ions in the second predetermined region 70 is greater than the concentration of potassium ions in the first predetermined region 60, and the strength of the second predetermined region 70 is greater than the strength of the first predetermined region 60. Detailed processes for strengthening the glass back cover 100 differentially from location to location will be further explained in the following.

Figure 13:
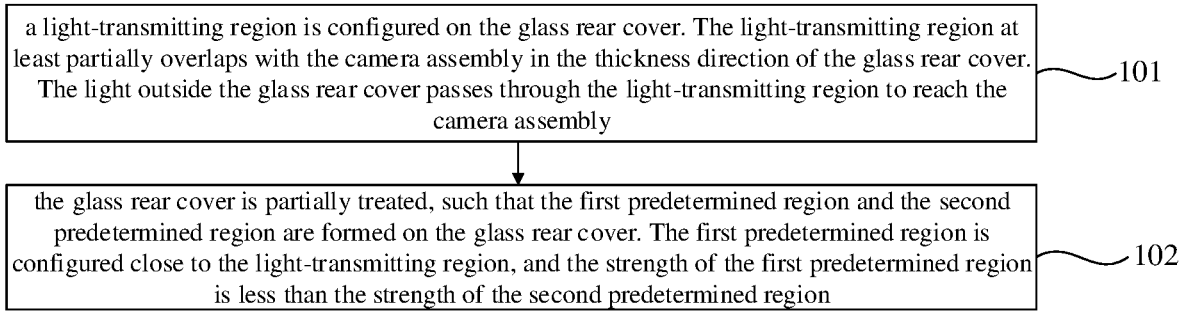
FIG. 13 is a flow chart of a method for manufacturing a glass rear cover according to an embodiment of the present disclosure.

The present disclosure also provides a method for manufacturing the glass rear cover. The method shows how to form the first predetermined region and the second predetermined region on the glass rear cover as described in the above. As shown in FIG. 13, FIG. 13 is a flow chart of a method for manufacturing a glass rear cover according to an embodiment of the present disclosure. The method includes operations 101 and 102.

In an operation 101, a light-transmitting region is configured on the glass rear cover. The light-transmitting region at least partially overlaps with the camera assembly in the thickness direction of the glass rear cover. The light outside the glass rear cover passes through the light-transmitting region to reach the camera assembly.

In detail, the light-transmitting region is a region of the glass rear cover that locates above the camera assembly and allows the light to pass through. The light-transmitting region is a part of the second surface of the glass rear cover that does not have screen printing ink. The light-transmitting region at least partially overlaps with the camera assembly in the thickness direction of the glass rear cover. The light outside the glass rear cover passes through the light-transmitting region to reach the camera assembly. In this way, the camera assembly can receive the light outside the glass rear cover through the light-transmitting region to achieve image capturing.

In an operation 102, the glass rear cover is partially treated, such that the first predetermined region and the second predetermined region are formed on the glass rear cover. The first predetermined region is configured close to the light-transmitting region, and the strength of the first predetermined region is less than the strength of the second predetermined region.

After performing the operation 102, the first predetermined region of the glass rear cover is formed near the light-transmitting region. Any part of the glass rear cover other than the first predetermined region is the second predetermined region, and the strength of the first predetermined region is less than the strength of the second predetermined region. Further, in various embodiments, various methods may be performed to enable the strength of the first predetermined region to be less than the strength of the second predetermined region. For example, the glass rear cover may be treated by mechanical means or chemical means, which will be illustrated in detail by illustrating various embodiments.

Figure 14:
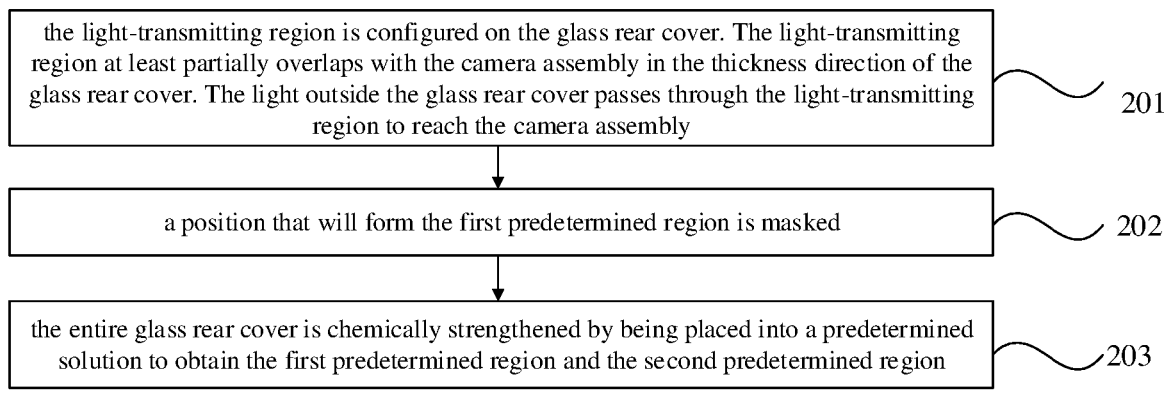
FIG. 14 is a flow chart of a method for manufacturing a glass rear cover according to another embodiment of the present disclosure.

As shown in FIG. 14, FIG. 14 is a flow chart of a method for manufacturing a glass rear cover according to another embodiment of the present disclosure. The method includes operations 201 to 203. The operation 201 may be the same as the operation 101 in the above embodiment, which will not be repeated herein. In detail, following operations are performed.

In an operation 201, the light-transmitting region is configured on the glass rear cover. The light-transmitting region at least partially overlaps with the camera assembly in the thickness direction of the glass rear cover. The light outside the glass rear cover passes through the light-transmitting region to reach the camera assembly.

In an operation 202, a position that will form the first predetermined region is masked, forming a masked position.

In detail, in the present embodiment, chemical strengthening is performed on a part of the glass rear cover. The chemical strengthening is not performed on the position of the glass rear cover that will form the first predetermined region, i.e., the masked position. In this way, the strength of the first predetermined region is less than the strength of the second predetermined region.

As illustrated in the above embodiments, the position that will form the first predetermined region is a position that surrounds the groove. However, it is not the first predetermined region that defines the groove. A part of the second predetermined region defines the groove. The part of the second predetermined region is configured between the first predetermined region and the camera assembly. The operation 202 is a process performed on the glass rear cover before the chemical strengthening to be performed. In this way, after the glass rear cover enters the chemical solution, the masked position is not chemically strengthened, or less strengthened. In detail, a material that is resistant to a temperature exceeding a predetermined temperature is adhered to or printed on the position that will form the first predetermined region. In other words, a material that is resistant to a high temperature is applied, such that the position that will form the first predetermined region is masked. Ion exchange between the masked position and the chemical solution is weakened or even completely prevented. In this way, a strengthened compressive stress of a surface of the masked position is reduced, or the surface of the masked position does not generate any compressive stress. Alternatively, the predetermined temperature of the material that is resistant to the high temperature can be determined based on demands and will not be limited herein.

In detail, the masked position of the glass rear cover may be close to and surround the light-transmitting region, and may be a circle, an arc, or a shape that includes a ring-shaped portion and a branched portion. The present disclosure does not limit the shape of the position of the glass rear cover.

In an operation 203, the entire glass rear cover is chemically strengthened by being placed into a predetermined solution to obtain the first predetermined region and the second predetermined region.

After the operation 202, the position that will form first predetermined region is masked. In the operation 203, the entire glass ear cover is placed into the predetermined solution, such that the ions at least in a position of the glass rear cover, which is not adhered by the material resistant to the high temperature, are exchanged with the ions in the solution. In detail, for example, the glass may be placed into a high-temperature chemical solution (such ash 400° C.) for a certain period of time (such as 0.5 h to 10 h). As the concentration of the ions in the solution and the concentration of the ions in the glass may be different, the ion diffusion effect occurs. Large-sized ions in the solution exchange with small-sized ions that locate at a certain depth of the glass rear cover. It shall be understood that, the glass rear cover contains sodium ions (Na+), and for example, the solution contains potassium ions (k+). In the process of chemically strengthening the glass rear cover, the potassium ions (k+) in the solution may exchange with sodium ions (Na+) in the glass rear cover. After the large-sized ions substitute the small-sized ions, the compressive stress is formed in the glass rear cover, the strength of the position at which the ion exchange occurs may be improved.

In the present embodiment, as the position that will form the first predetermined region is masked, while strengthening the glass rear cover, only the position that will form the second predetermined region, i.e., the position that is not masked, is strengthened. The masked position is not strengthened, or the number of ions, which locate at the masked position for ion exchange, is limited. A strengthened effect of the masked position is less than that of the unmasked position. In this way, the first predetermined region and the second predetermined region are formed, the concentration of the potassium ions in the second predetermined region is greater than that in the first predetermined region, and the strength of the second predetermined region is greater than that of the first predetermined region.

After the operation 203, the strength of the first predetermined region is less than that of the second predetermined region. When the external force is applied to the glass rear cover, the crack is generated. When the crack extends to approach the camera assembly, the crack firstly extends to reach the first predetermined region and further extends away from the camera assembly, such that the camera assembly is protected.

It shall be understood that, a one-process chemical strengthening is performed in the above embodiments. In other embodiments, a two-process chemical strengthening may be performed.

In detail, the two-process chemical strengthening includes two strengthening processes. In a first strengthening process, the sodium ions Na+ may substitute lithium ions Li+ which are even smaller than the sodium ions. As an activity of Na+/Li+ exchange is high, the ions that locate at a depth of >100 um may be exchanged. However, as the size of Na+ is relatively small, the compressive stress at the depth is also relatively small, which may be 10 MPa~200 MPa. In a second strengthening processes, the potassium ion K+ may substitute the sodium ions Na+ in the glass, a compressive stresses of up to 500 MPa~1200 MPa may be generated on the surface of the glass, and the K+ at the depth of 3 um~30 um may be exchanged in the second strengthening process.

By applying the two-process chemical strengthening, at least a partial region of the glass rear cover may have increased strength.

Alternatively, masking the position that will for the first predetermined region in the operation 202 is applicable for performing the one-process chemical strengthening and for performing the two-process chemical strengthening. In detail, the position may be masked when performing the one-process chemical strengthening, and the position may not be masked when performing the two-process chemical strengthening. Alternatively, the position may not be masked when performing the one-process chemical strengthening, and the position may be masked when performing the two-process chemical strengthening. Alternatively, the position may not be masked when performing the one-process chemical strengthening and performing the two-process chemical strengthening. The present disclosure does not limit the process in which the masking needs to be performed. In detail, the one-process chemical strengthening refers to a process of the large-sized particles in the solution substituting the small-sized particles in the glass as described in the above embodiments. For example, the potassium ions in the solution substitute the sodium ions in the glass, or the sodium ions in the solution substitute the lithium ions in the glass, and only one exchanging process is performed. A principle of the two-process chemical strengthening also refers to a process of the large-sized particles in the solution substituting the small-sized particles in the glass, but two ion exchange processes are performed. For example, in the above embodiments, the process of exchanging the potassium ions in the solution with the sodium ions in the glass and the process of exchanging the sodium ions in the solution with the lithium ions in the glass are both performed.

Figure 15:
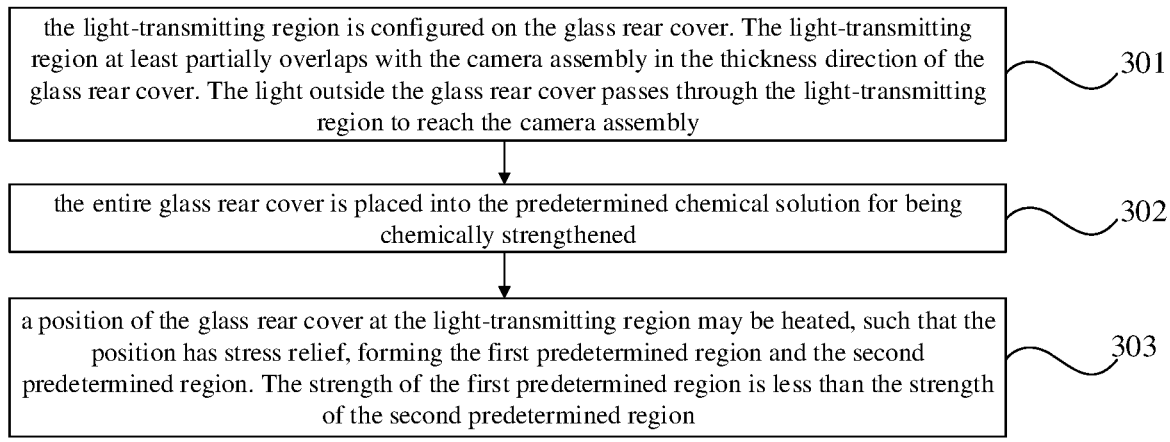
FIG. 15 is a flow chart of a method for manufacturing a glass rear cover according to still another embodiment of the present disclosure.

As shown in FIG. 15, FIG. 15 is a flow chart of a method for manufacturing a glass rear cover according to still another embodiment of the present disclosure. The method includes operations 301 to 303. The operation 301 may be the same as the operation 101 in the above embodiment, and will not be repeated herein. In detail, following operations are performed.

In an operation 301, the light-transmitting region is configured on the glass rear cover. The light-transmitting region at least partially overlaps with the camera assembly in the thickness direction of the glass rear cover. The light outside the glass rear cover passes through the light-transmitting region to reach the camera assembly.

In an operation 302, the entire glass rear cover is placed into the predetermined chemical solution for being chemically strengthened.

In the operation 302, the position that will form the first predetermined region is not masked, and the entire glass rear cover is placed into the predetermined chemical solution for being chemically strengthened. That is, after the operation 302, strengths of various positions of the glass rear cover may be substantially the same. The first and the second predetermined regions are not formed at this stage.

In an operation 303, a position of the glass rear cover at the light-transmitting region may be heated, such that the position has stress relief, forming the first predetermined region and the second predetermined region. The strength of the first predetermined region is less than the strength of the second predetermined region.

In the operation 303, the position of the glass rear cover at the light-transmitting region may be heated, that is, the position that will form the first predetermined region may be heated. For example, a laser may be applied to a weak region 3 to heat the weak region up to 300° C. to 1000° C. The heated position of the glass may be transformed from being brittle into being ductile, and even being in a liquid phase. In such a status, the compressive stress that is generated at the position by the chemical strengthening in the operation 302 may be weakened or even eliminated due to the stress relief caused by particles inside the glass flowing. In this way, the first predetermined region and the second predetermined region are formed.

In detail, the stress relief refers to the stress inside a structure being re-distributed due to a partial ductile deformation caused by a peak of the compressive stress. The peak of the compressive stress, which is originally flexibly distributed, may be reduced, such that a stress relief effect occurs, the compressive stress being distributed unevenly may be avoided.

The stress relief in the strengthen glass may be interpreted as follows. The strengthened compressive stress of the glass may be generated when an outer layer of the glass tends to expand outwardly, whereas an inner layer of the glass prevents the outer layer of the glass from expanding. However, when the temperature of the glass increases to allow particles inside the glass to move, enabling the glass to be ductile or even in the liquid phase, the inner layer of the glass may creep, such that the inner layer of the glass may not drag the outer layer of the glass. Therefore, the compressive stress applied to the outer layer of the glass may be reduced or eliminated.

In other embodiments, heating the position of the glass rear cover at the light-transmitting region may be achieved by other means, such as by a heat gun, which will not be limited herein.

In an embodiment, treating the glass rear cover by regions may include following operations. The position of the glass rear cover that will form the first predetermined region defines the groove, reducing the thickness of the position of the glass rear cover, such that the strength of the position of the glass rear cover is reduced. The first predetermined region and the second predetermined region are formed at the position in which the groove is defined, and the strength of the first predetermined region is less than the strength of the second predetermined region. Alternatively, the groove may be defined close to and sounds the light-transmitting region, and may be a circle, an arc, or a shape that includes a ring-shaped portion and a branched portion. The present disclosure does not limit the shape of the groove.

In detail, a width of the groove defined in the glass rear cover may be in a range of 0.05 mm to 5 mm. The width may be determined based on an appearance of the electronic device. A depth of the groove may be in a range of 0.01 mm to ⅘ t (wherein the t is a total thickness of the glass).

It shall be understood that, in an embodiment, the glass rear cover is chemically strengthened. Defining the groove in the glass rear cover may be performed before or after the glass being chemically strengthened, which will not be limited herein.

According to a first aspect, a glass rear cover includes a light-transmitting region. The light-transmitting region is configured to at least partially overlap with a camera assembly in a thickness direction of the glass rear cover. The light-transmitting region is configured to allow light out of the glass rear cover to pass through the light-transmitting region to enter the camera assembly. The glass rear cover comprises at least one first predetermined region and a second predetermined region, the at least one first predetermined region is disposed close to the light-transmitting region, and a strength of the at least one first predetermined region is less than a strength of the second predetermined region.

In some embodiments, the glass back cover defines a groove, and the at least one first predetermined region is configured at a position where the groove is defined.

In some embodiments, the glass rear cover includes a first surface and a second surface opposite to the first surface; the groove is defined in the second surface; and a light incident surface of the camera assembly abuts against the second surface, or is spaced apart from the second surface.

In some embodiments, the at least one first predetermined region surrounds a periphery of the light-transmitting region.

In some embodiments, the at least one first predetermined region comprises a ring-shaped portion and a branched portion, and the branched portion extends from the ring-shaped portion in a direction away from the light-transmitting region.

In some embodiments, a concentration of potassium ions in the second predetermined region is greater than a concentration of potassium ions in the at least one first predetermined region.

In some embodiments, the camera assembly comprising a first camera module and a second camera module; the glass rear cover includes one first predetermined region, the one first predetermined region surrounds a periphery of the light-transmitting region, and the light-transmitting region is configured to at least partially overlap with both the first camera module and the second camera module in the thickness direction of the glass rear cover; or the glass rear cover includes two first predetermined regions, the light-transmitting region include a first light-transmitting region and a second light-transmitting region, the first light-transmitting region is configured to at least partially overlap with the first camera module in the thickness direction of the glass rear cover, the second light-transmitting region is configured to at least partially overlap with the second camera module in the thickness direction of the glass rear cover, the two first predetermined regions are configured close to the first light-transmitting region and the second light-transmitting region, respectively.

According to a second aspect, an electronic apparatus is provided and includes a glass rear cover. The glass rear cover includes a light-transmitting region, the light-transmitting region is configured to at least partially overlap with the camera assembly in a thickness direction of the glass rear cover. The light-transmitting region is configured to allow light out of the glass rear cover to pass through the light-transmitting region to enter the camera assembly. The glass rear cover includes at least one first predetermined region and a second predetermined region, the at least one first predetermined region is configured close to the light-transmitting region, and a strength of the at least one first predetermined region is less than a strength of the second predetermined region.

In some embodiments, the glass rear cover defines a groove, and the at least one first predetermined region is configured at a position where the groove is defined.

In some embodiments, the glass rear cover includes a first surface and a second surface opposite to the first surface, wherein the second surface is a surface that faces an inside of the electronic apparatus; the groove is defined in the second surface; a light incident surface of the camera assembly abuts against the second surface, or is spaced apart from the second surface.

In some embodiments, the first predetermined region surrounds a periphery of the light-transmitting region.

In some embodiments, the at least one first predetermined region comprises a ring-shaped portion and a branched portion, and the branched portion extends from the ring-shaped portion in a direction away from the light-transmitting region.

In some embodiments, a concentration of potassium ions in the second predetermined region is greater than a concentration of potassium ions in the first predetermined region.

In some embodiments, the camera assembly comprising a first camera module and a second camera module.

In some embodiments, the glass rear cover includes one first predetermined region, the one first predetermined region surrounds a periphery of the light-transmitting region, and the light-transmitting region is configured to at least partially overlap with both the first camera module and the second camera module in the thickness direction of the glass rear cover; or the glass rear cover includes two first predetermined regions, the light-transmitting region includes a first light-transmitting region and a second light-transmitting region, the first light-transmitting region is configured to at least partially overlap with the first camera module in the thickness direction of the glass rear cover, the second light-transmitting region is configured to at least partially overlap with the second camera module in the thickness direction of the glass rear cover, the two first predetermined regions are configured close to the first light-transmitting region and the second light-transmitting region, respectively.

According to a third aspect, a method for manufacturing the glass rear cover is provided and includes following operations.

A light-transmitting region is configured on the glass rear cover, wherein the light-transmitting region is configured to at least partially overlap with a camera assembly in a thickness direction of the glass rear cover, the light-transmitting region is configured to allow light out of the glass rear cover to pass through the light-transmitting region to enter the camera assembly.

The glass rear cover is processed by regions, such that at least one first predetermined region and a second predetermined region are formed on the glass rear cover, wherein the first predetermined region is configured close to the light-transmitting region, and a strength of the first predetermined region is less than a strength of the second predetermined region.

In some embodiments, processing the glass rear cover by region, includes: masking a position that will form the first predetermined region; and placing the entire glass rear cover into a predetermined solution for being chemically strengthened to obtain the first predetermined region and the second predetermined region.

In some embodiments, the masking a position that will form the first predetermined region, includes: adhering or printing a material that is resistant to a temperature exceeding a predetermined temperature to the position that will form the first predetermined region.

In some embodiments, the treating a portion of the glass rear cover, includes: placing the entire glass rear cover into a predetermined solution for being chemically strengthened; and heating a portion of the glass rear cover located in the light-transmitting region to generate stress relief at the portion to form the first predetermined region and the second predetermined region, wherein the strength of the first predetermined region is less than the strength of the second predetermined region.

In some embodiments, the treating a portion of the glass rear cover, includes: defining a groove in a position of the glass rear cover that will form the first predetermined region, such that forming the first predetermined region and the second predetermined region, wherein the strength of the first predetermined region is less than the strength of the second predetermined region.

The above description shows only implementations of the present disclosure, but does not limit the scope of the present disclosure. Any equivalent structural or process transformation performed based on the drawings and the specification of the present disclosure, applied directly or indirectly in other related art, shall be included in the present disclosure.

What is claimed is:

1. A glass rear cover, comprising a light-transmitting region,
   wherein the light-transmitting region is configured to at least partially overlap with a camera assembly in a thickness direction of the glass rear cover,
   the light-transmitting region is configured to allow light out of the glass rear cover to pass through the light-transmitting region to enter the camera assembly;
   the glass rear cover comprises at least one first predetermined region and a second predetermined region, the at least one first predetermined region is disposed close to the light-transmitting region and is configured to turn an extension direction of a crack, which is approaching the light-transmitting region, away from the light-transmitting region; the at least one first predetermined region is disposed between the light-transmitting region and at least part of the second predetermined region, and a strength of the at least one first predetermined region is less than a strength of the at least part of the second predetermined region.

2. The glass rear cover according to claim 1, wherein the glass rear cover defines a groove, and the at least one first predetermined region is configured at a position where the groove is defined.

3. The glass rear cover according to claim 2, wherein,
   the glass rear cover comprises a first surface and a second surface opposite to the first surface;
   the groove is defined in the second surface; and
   a light incident surface of the camera assembly abuts against the second surface, or is spaced apart from the second surface.

4. The glass rear cover according to claim 1, wherein the at least one first predetermined region surrounds a periphery of the light-transmitting region.

5. The glass rear cover according to claim 4, wherein the at least one first predetermined region comprises a ring-shaped portion and a branched portion, and the branched portion extends from the ring-shaped portion in a direction away from the light-transmitting region.

6. The glass rear cover according to claim 1, wherein a concentration of potassium ions in the second predetermined region is greater than a concentration of potassium ions in the at least one first predetermined region.

7. The glass rear cover according to claim 1, wherein
   the camera assembly comprising a first camera module and a second camera module;
   the glass rear cover comprises one first predetermined region, the one first predetermined region surrounds a periphery of the light-transmitting region, and the light-transmitting region is configured to at least partially overlap with both the first camera module and the second camera module in the thickness direction of the glass rear cover; or
   the glass rear cover comprises two first predetermined regions, the light-transmitting region comprises a first light-transmitting region and a second light-transmitting region, the first light-transmitting region is configured to at least partially overlap with the first camera module in the thickness direction of the glass rear cover, the second light-transmitting region is configured to at least partially overlap with the second camera module in the thickness direction of the glass rear cover.

8. An electronic apparatus, comprising a camera assembly and a glass rear cover,
   wherein the glass rear cover comprises a light-transmitting region, the light-transmitting region is configured to at least partially overlap with the camera assembly in a thickness direction of the glass rear cover,
   the light-transmitting region is configured to allow light out of the glass rear cover to pass through the light-transmitting region to enter the camera assembly;
   the glass rear cover comprises at least one first predetermined region and a second predetermined region, the at least one first predetermined region is configured close to the light-transmitting region and is configured to turn an extension direction of a crack, which is approaching the light-transmitting region, away from the light-transmitting region; the at least one first predetermined regin is disposed between the light-transmitting region and at least part of the second predetermined region, and a strength of the at least one first predetermined region is less than a strength of the at least part of the second predetermined region.

9. The electronic apparatus according to claim 8, wherein the glass rear cover defines a groove, and the at least one first predetermined region is configured at a position where the groove is defined.

10. The electronic apparatus according to claim 9, wherein,
   the glass rear cover comprises a first surface and a second surface opposite to the first surface;
   the groove is defined in the second surface; and
   a light incident surface of the camera assembly abuts against the second surface, or is spaced apart from the second surface.

11. The electronic apparatus according to claim 8, wherein the at least one first predetermined region surrounds a periphery of the light-transmitting region.

12. The electronic apparatus according to claim 11, wherein the at least one first predetermined region comprises a ring-shaped portion and a branched portion, and the branched portion extends from the ring-shaped portion in a direction away from the light-transmitting region.

13. The electronic apparatus according to claim 8, wherein a concentration of potassium ions in the second predetermined region is greater than a concentration of potassium ions in the at least one first predetermined region.

14. The electronic apparatus according to claim 8, wherein the camera assembly comprising a first camera module and a second camera module.

15. The electronic apparatus according to claim 14, wherein
   the glass rear cover comprises one first predetermined region, the one first predetermined region surrounds a periphery of the light-transmitting region, and the light-transmitting region is configured to at least partially overlap with both the first camera module and the second camera module in the thickness direction of the glass rear cover; or
   the glass rear cover comprises two first predetermined regions, the light-transmitting region comprises a first light-transmitting region and a second light-transmitting region, the first light-transmitting region is configured to at least partially overlap with the first camera module in the thickness direction of the glass rear cover, the second light-transmitting region is configured to at least partially overlap with the second camera module in the thickness direction of the glass rear cover.

* * * * *